Feb. 11, 1930.                N. TRBOJEVICH                1,746,722
                                  GEARING
                        Filed April 25, 1927      4 Sheets-Sheet 1
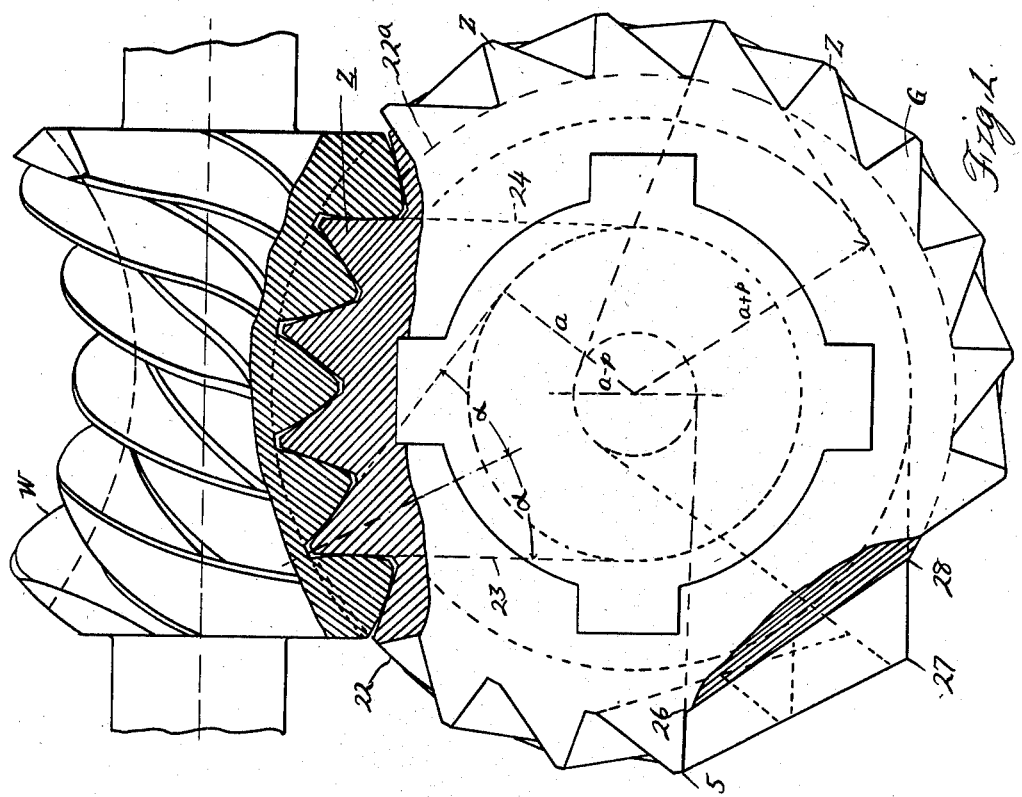
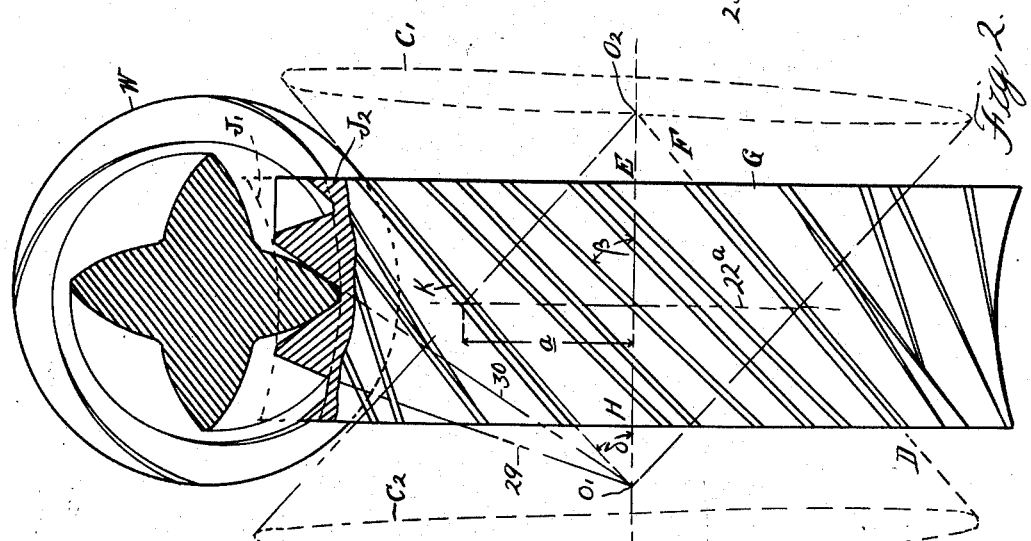
Inventor
Nikola Trbojevich
By
Attorneys Feb. 11, 1930.   N. TRBOJEVICH   1,746,722
GEARING
Filed April 25, 1927   4 Sheets-Sheet 2
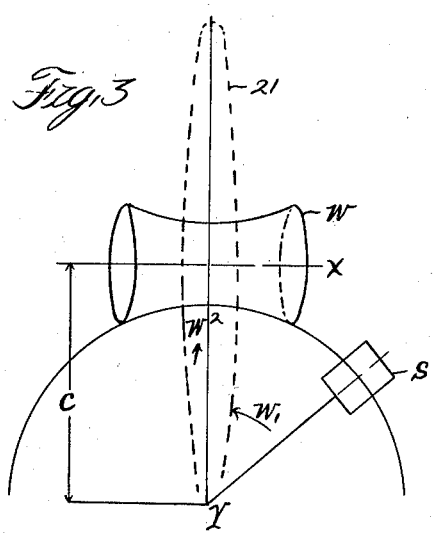
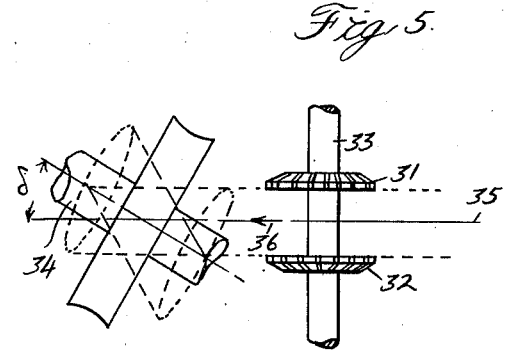
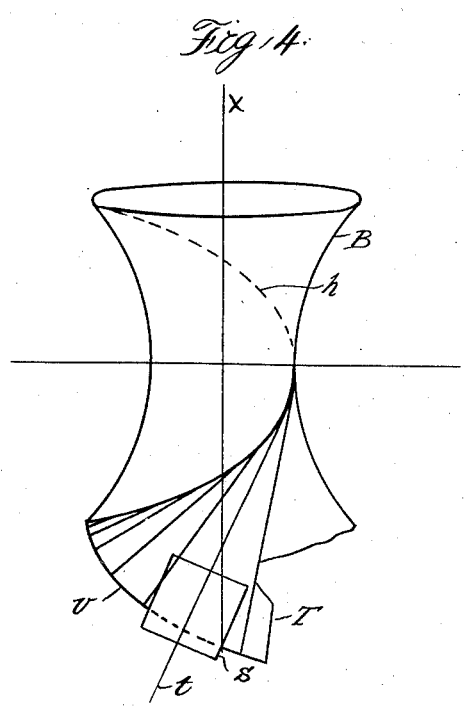
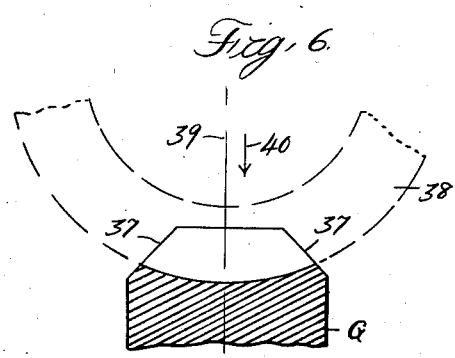
Inventor
Nikola Trbojevich
By
Whitemore Hulbert Whittemore Belknap
Attorneys Feb. 11, 1930.    N. TRBOJEVICH    1,746,722
GEARING
Filed April 25, 1927    4 Sheets-Sheet 3
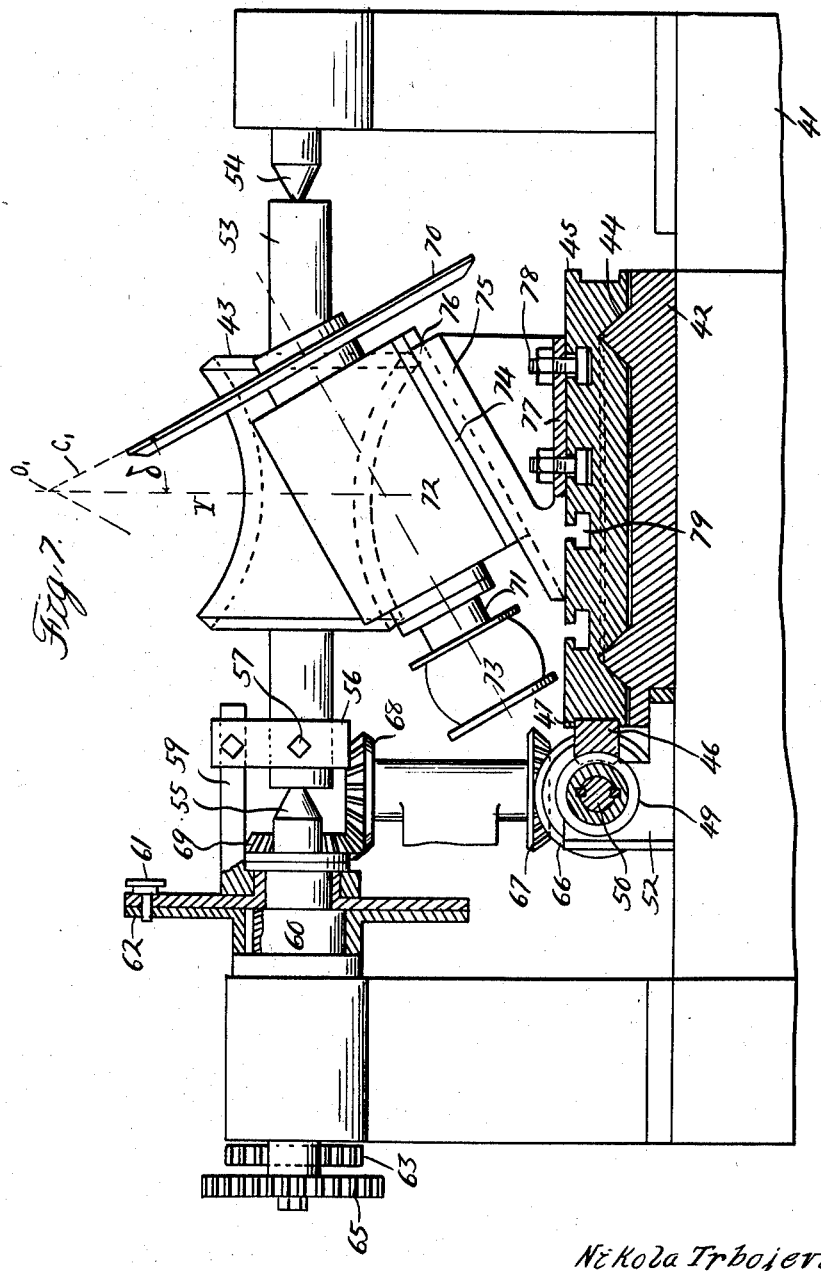
Inventor
Nikola Trbojevich
By
Attorneys

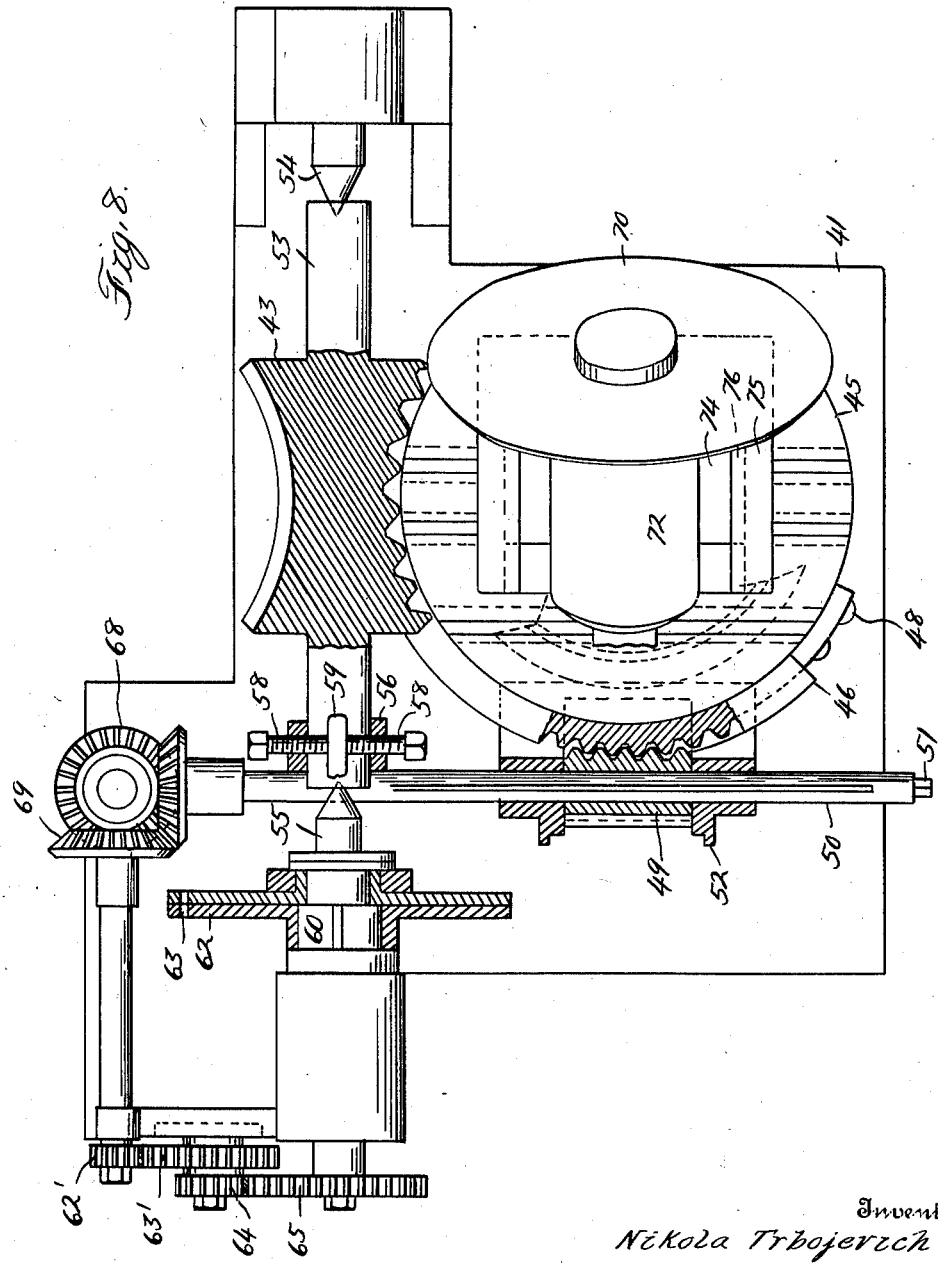

Patented Feb. 11, 1930

1,746,722

UNITED STATES PATENT OFFICE

NIKOLA TRBOJEVICH, OF HIGHLAND PARK, MICHIGAN, ASSIGNOR TO THE TIMKEN-DETROIT AXLE COMPANY, OF DETROIT, MICHIGAN, A CORPORATION OF OHIO

GEARING

Application filed April 25, 1927. Serial No. 186,514.

The invention relates to a novel kind of worm gearing of the globoid or "Hindley" type. The main object of this invention is to devise a gear of the above mentioned type that is suitable for axle drives of automobiles and trucks, i. e. a gear that will correctly mesh at high helical angles usually employed in such drives and one that may be manufactured economically and with a high degree of accuracy.

In the preferred modification of the new worm drive the gear member is a hyperboloidal rack wheel the tooth surfaces of which are a series of planes arranged about the gorge portion of a hyperboloid of revolution. The worm member is developed from a base globoid by a generating or enveloping motion of one of the said rack planes, said rack plane being replaced in practice by its kinematical equivalent such as a plane disk cutter or grinder.

In the drawings:

Fig. 1 is an elevation of the new worm and gear showing in cross section the conditions of meshing in the central plane and also the formation of one full tooth.

Fig. 2 is a side view of the pair shown in Fig. 1 also showing the disposition of the two base cones from which the gear teeth are developed.

Fig. 3 is a diagram explanatory of the theory of worm thread generation by rotating the tangent plane simultaneously about two axes.

Fig. 4 is a diagram showing a portion of the generated surface of the worm.

Fig. 5 diagrammatically shows the method of cutting the teeth of the gear in a common milling machine.

Fig. 6 is a diagram showing the method of selecting the diameter of the milling cutter when the worm wheel teeth are cut by the "sinking-in" method.

Fig. 7 is the elevation of a machine adapted to grinding of threads of the new worm.

Fig. 8 is the plan view of the machine shown in Fig. 7.

The mathematical principle forming the basis of this invention will be readily understood by all those familiar with the infinitesimal calculus as related to the theory of surfaces. It is evident that in a worm drive of the Hindley type all teeth of the gear must be alike if a transmission of rotation at a constant ratio is to be obtained. Considering now the different portions of the mating globoid or "hour-glass" worm thread, I have discovered that the tooth curves or profiles of said thread should be different at each point, because of different radii of rotation, pitch, helical angles, etc., at those points. I compensate for the last named variations by suitably changing the worm thread profiles progressively from the large end of the worm toward the small or the "throat" diameter.

Thus, according to this theory a suitable form of gear is first selected, said gear having a plurality of equal and equi-spaced teeth distributed along an assumed surface of revolution. The process of generating the mating hour glass worm should consist of the following steps:

(1) Find a cutting tool that will duplicate in its cutting path one tooth of the imaginary worm wheel. (2) Translate the tool about the axis of the wheel in a circular arc at a constant angular velocity $w_1$. (3) Place the axis of the worm to be generated in the central plane of the imaginary worm wheel at the required center distance C. (4) Let the worm W (Fig. 3) stand still and rotate the tool in the orbit 21 with a constant angular velocity $w_2$ about the axis X of the blank. If these four conditions are fulfilled, a globoid thread of the indicated type will be generated in the blank W.

As is diagrammatically shown in Fig. 3 the worm gear tooth is a plane S. The reason for selecting a plane as a generating member lies in the fact that a plane is easily reproduced by means of a rotary cutter. However, broadly, my invention also includes modifications in which the generant S is a portion of some other simple geometrical surface such as a portion of a cylinder, a cone or a hyperboloid. When the generant S is a plane, a particularly attractive geometrical relationship is created in that the generated thread surface is first developable in a plane, and second, it contacts with the generant (and also with the mating gear) always along a straight line.

The last two statements may be verified mathematically. When the plane S, Fig. 3, is rotated about the axis Y at the constant velocity $w_1$ and is also simultaneously rotated about the axis X at the constant velocity $w_2$, the result is a family (an infinite number) of planes governed by one parameter only, because, although the plane S rotates about two axes and thus initially possesses two parameters, one of said parameters may be eliminated from the equations due to the predetermined and constant ratio existing between said two rotations. It follows, therefore, that the plane S will describe a helicoidal path about the axis X and in so doing it will always be an osculating plane to a certain globoidal base helix drawn about the said axis $x$. It further follows from the well established laws of the differential geometry that the surface enveloped by said moving plane of one parameter is a tangential surface to the said base helix, i. e. a surface composed entirely of straight lines; that all these straight lines are tangent to the base helix and that the locus of contact with the generating plane is always along one of said tangents.

These conditions are illustrated in Fig. 4. The tangential surface T of the base helix $h$ is ruled and developable, and the generating plane S touches said surface along the tangent $t$. The contour curve U of the worm thread will be different in each transverse section of the base globoid B although, in general, it will always resemble an involute of a circle. When the surface T together with the base helix $h$ are developed in a plane, the helix $h$ will become a spiral and the lines $t$ will remain tangent to said spiral.

To apply the above theoretical conclusions in a practical way, I first proceed to construct the worm wheel. As shown in Figs. 1 and 2 the teeth $z$ are evenly spaced along the circumference of the pitch circle 22. Two base cones $C_1$ and $C_2$ each having a cone angle $\delta$ and the axis Y of the wheel for their common axis, are drawn from the apexes $O_1$ and $O_2$ respectively so that they intersect each other in a circle of a radius $a$, the base circle, in the central plane $22^a$. The base radius $a$ is preferably so determined that the tangent planes 23 and 24 will be parallel to each other when they straddle a predetermined number of teeth, e. g. four teeth in the example shown in Fig. 1, each tooth having a pressure angle $\alpha$. This method of selecting the base radius is not theoretically necessary, but it does facilitate the calculation and the setting up of gear cutters in practice.

Each tooth Z consists of two plane tooth surfaces one of which is tangent to the base cone $C_1$ and the other to the cone $C_2$. The value of the base cone angle $\delta$ depends both upon the selected helical angle $\beta$ and the pressure angle $\alpha$, said mathematical relation being:

$$\tan \delta = \tan \beta \cos \alpha$$

In the position D F, Fig. 2, the tangent plane to the cone $C_2$ is perpendicular to the plane of the paper. A projection of the same plane in Fig. 1 is the quadrangular tooth plane 25, 26, 27 and 28. The opposite sides 25—26 and 27—28 of said quadrangle are parallel to each other and the first side is tangent to the small circle of a radius $a-p=EF$ while the other side 27—28 is tangent to the large circle of a radius $a+p=HD$. It is to be noted that the other two sides of the quadrangle 25—27 and 26—28 respectively, each lie upon the surface of a corresponding hyperboloid of revolution, $J_1$ and $J_2$, Fig. 2, for which reason the new gear may properly be classified as a hyperboloidal gear.

In the new worm gear due to the fact that all tooth surfaces are planes, the intersections of said teeth with any other planes are straight lines, and all straight lines so derived must be tangent to either one or the other of the two base cones. Of particular interest is the central section formed by intersecting the teeth with the plane $22^a$, Fig. 1 as there the tooth edges are simultaneously tangent to both cones. Another interesting section is the axial section of the gear formed with any plane containing the axis Y. As is shown in Fig. 2, the tooth edges 29 and 30 thus formed converge in the apex $O_1$ of the cone $C_1$.

The method of cutting the new worm gears is rather simple and may be accomplished in a common milling machine. As was previously stated, the plane 25, 26, 27 and 28 in Fig. 1 is perpendicular to the plane of the paper in Fig. 2 and coincides with the line D F. Therefore, a plane disk cutter aligned with the said plane will finish the quadrangle 25—28 at all its points when fed across the face of the gear so that it always remains in its cutting plane. To finish all the teeth of the gear, the blank must be indexed after each passage of the cutter which operation will finish the teeth on their one side. To finish the opposite sides, the blank may be reversed on its arbor and the cuts repeated.

It is also possible to finish both sides of the teeth at the same time, in which case two cutters are employed for the purpose. An arrangement of this kind is diagrammatically shown in Fig. 5. Two plane disk cutters 31 and 32 are mounted upon their common arbor 33, at the exact required distance from each other. The distance spanned by the two cutters may readily be computed by examining Fig. 2 from which it is seen that one of the cutters is translated along the line D F, and the other along the parallel line $O_1 K$. The distance of the said two parallel lines from each other is equal to $2a \cos \delta$. The blank G, the outside diameter of which might have been finished to the hyperbolic contour $J_1$ or any other convenient contour, is placed upon the arbor 34 and firmly held in position during each passage of the cutters 31 and 32 across the face of the blank. The center line of the arbor 34 forms the exact angle $\delta$ with the line of feed 35, said feed being in the direction of the arrow 36. The blank G is indexed after each passage of the cutters in the conventional manner.

Fig. 6 diagrammatically shows another method of forming the outside diameter of the gear blank G and of cutting the teeth. In this case the blank G is considerably narrower than the one shown in Figs. 1 and 2 and the corners are chamfered to form two cones 37. The cutter 38 is selected of a sufficiently large diameter to clear the mating worm W, Fig. 1 and instead of feeding the cutter across the face of the gear as in the previous example, the cutter is simply sunk into the blank thus producing the required tooth planes.

Figs. 7 and 8 show an elevation and a plan view respectively of a machine adapted to grinding of worms of the new kind. The base 41 is provided with a flat top upon which the circular base plate 42 is bolted at the required exact center distance from the axis of the worm 43. The rotary table 45 fits over the annular bearing 44 formed into the top of the stationary base plate 42 and may be rotated by means of the worm gear segment 46, said segment being securely held in the slot 47 by means of bolts 48, and the worm 49. The worm spindle 50 is splined in order to render it possible to use the same apparatus for various center distances and is provided with a square end 51 for the purpose of driving. The worm 49 is held in position by means of the bifurcated bracket 52.

The worm 43 to be ground is in this case integral with its two shanks 53 and is held in a strictly-central position by means of the tail stock center 54 and the head stock center 55, both of them longitudinally adjustable. The rotation is transmitted through the clamp 56, said clamp having a tightening set screw 57 and two fine adjusting screws 58, and through the dog 59. The dog 59 is keyed to the first index plate and may be rotated on the head stock spindle 60 by releasing the index pin 61. The second index plate 62 is provided with the required number of accurately spaced holes 63 for the purpose of indexing the work and is keyed to the spindle 60.

The required timed rotation between the table 45 and the work 43 is obtained by properly selecting the timing gears 62', 63', 64 and 65, while the bevel gears 66, 67, 68 and 69 are preferably all in the ratio of one to one and form a permanent part of this machine.

The grinder 70 is a plane disk and is so adjusted in the machine that its plane face touches the base cone $C_1$ on the inside. The grinder 70 is securely held on the spindle 71 in the bearing 72 and is driven by means of pulley 73. The base of the bearing 72 is formed into a rectangular slide 74, said slide being exactly parallel to the axis of the spindle 71. By means of the last named slide and suitable bolts the grinder 70 may be finely adjusted longitudinally so that it will always remain parallel to its original plane of rotation. The angle plate 75 is formed to an exact angle of the base cone $C_1$, the top surface of the said plate being formed in a slide way 76 to accommodate the slide 74, and the bottom surface 77 may be clamped to the rotary table 45 by means of T bolts 78 and T slots 79 in any required transverse position, depending upon the diameter of the grinder used.

From this the operation of the machine will be understood. The grinder 70 represents one side of a full tooth of the imaginary hyperboloidal wheel with which the worm to be ground is going to mesh. When the spindle 50 is rotated, (Fig. 8), the grinder will begin to advance into the work from right to left and the work also will be rotating simultaneously at the predetermined ratio. Providing the wheel 70 is large enough to totally embrace the quadrangle 25, 26, 27 and 28, Fig. 1, this process will produce a correct and variable curvature in the thread at every point of the worm 43 with the result that the thread so formed will at all times have a straight line contact with the tooth of the gear and, yet, no portion of such thread will interfere with the free passage of the gear tooth, regardless of the velocity of rotation.

The machine shown in Figs. 7 and 8 is set to grind a right hand worm. A left hand worm may be ground by placing the grinder on the left hand side of the rotary table 45 as it will be understood. After a certain thread of the worm 43 has been ground, the work may be indexed and the process repeated until all threads are ground. To grind the other side of the thread, the work 43 may be reversed on its arbor and the process repeated.

Claims:
1. A worm wheel having a plurality of equal and equi-distant teeth arranged about an axis of rotation in such a manner that all tooth surfaces are composed of straight lines, that all tooth surfaces on one side of the teeth are in a predetermined relation to one base cone, and the surfaces on the other side of the teeth are similarly related to the other base cone, and that the two base cones are disposed co-axially with the said axis of rotation and intersect each other in a circle in the central plane of the wheel.

2. A worm wheel the tooth surfaces of which are a series of plane polygons arranged in such a manner about an axis of rotation that the polygons forming one side of the teeth all pass through a focus in the axis of rotation, and the polygons forming the other side of the teeth all pass through another focus, and the two foci are symmetrically disposed relative to the central plane of the wheel.

3. A worm wheel the tooth surfaces of which are all portions of planes, and all planes forming one side of the teeth of which are tangent to a base cone, and the planes forming the other side of the teeth are tangent to another base cone.

4. A combination of a worm and a worm wheel in which the wheel has a plurality of teeth the tooth surfaces of which are composed entirely of straight lines all drawn in a predetermined relation relative to two base cones, and in which the worm threads are developed about a globoidal pitch surface as geometrical envelopes formed by rotating one of the first named tooth surfaces simultaneously and in a timed relation about the axis of the worm and about another axis lying in a plane at right angles thereto.

5. A combination of a worm and a worm wheel in which all tooth surfaces of the wheel teeth are portions of planes tangent to two base cones and in which the worm threads are wound about a concave globoidal pitch surface and are formed as the geometrical envelopes of said plane segments when the wheel and the worm are meshed together at the predetermined ratio of rotation and center distance.

6. A combination of a worm wheel having a plurality of straight teeth all inclined at an acute angle relative to the axis of rotation and arranged about the gorge portion of a hyperboloid of revolution and a worm of the concave-globoid hour-glass type having threads formed as the geometrical envelopes of said wheel teeth, when the two members are rotated in a timed relation, at a predetermined center distance and with their respective axes disposed in two planes at right angles to each other.

7. A hyperboloidal worm wheel capable of meshing with a globoid worm and having teeth, the center lines of which lie on the surface of a hyperboloid of revolution in which the cross sections of said teeth are symmetrical in the gorge plane of the hyperboloid and are non-symmetrical in all other planes perpendicular to the axis.

8. A hyperboloidal worm wheel, the teeth of which are disposed longitudinally about the surface of a hyperboloid and the opposite tooth surfaces of which in a section perpendicular to the axis are generated from two concentric base circles of different radii, the sum of said two radii being constant in all sections.

9. A hyperboloidal worm wheel having straight sided teeth in any axial plane section, the arrangement being such that the lines of intersection with said plane on one side of the teeth converge at a focus in the axis of rotation, and the corresponding lines of intersection on the other side converge at another focus similarly disposed.

10. A hyperboloidal worm wheel, the tooth surfaces of which are developable from two co-axial base cones and are so spaced relative to said cones that the opposite tooth surfaces of two non-consecutive teeth are capable of being generated by two parallel planes.

11. The combination of a worm and a worm wheel, the worm wheel being hyperboloidal and having tooth surfaces developable from two base cones, and said worm is of a globoid form having tooth surfaces of such contour as are developed by a plane rolling about said two base cones co-axial with the axis of said wheel.

In testimony whereof I affix my signature.

NIKOLA TRBOJEVICH.